(12) United States Patent
Li et al.

(10) Patent No.: US 9,398,162 B1
(45) Date of Patent: *Jul. 19, 2016

(54) SYSTEMS AND METHODS FOR PLAYING RECORDED ANNOUNCEMENTS

(71) Applicant: Sonus Networks, Inc., Westford, MA (US)

(72) Inventors: Shiping Li, Acton, MA (US); John A. Perreault, Hopkinton, MA (US); Xiang Yu, Andover, MA (US)

(73) Assignee: SONUS NETWORKS, INC., Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/588,367

(22) Filed: Dec. 31, 2014

Related U.S. Application Data

(63) Continuation of application No. 13/030,064, filed on Feb. 17, 2011, now Pat. No. 8,953,752.

(51) Int. Cl.
| | |
|---|---|
| *H04M 1/64* | (2006.01) |
| *H04M 7/00* | (2006.01) |
| *H04M 7/12* | (2006.01) |
| *H04M 3/42* | (2006.01) |

(52) U.S. Cl.
CPC ............ *H04M 7/0072* (2013.01); *H04M 7/129* (2013.01)

(58) Field of Classification Search
CPC ....... H04M 3/487; H04M 3/493; H04M 7/00; H04M 7/0009; H04M 7/12

USPC ............................ 379/88.01–88.19; 455/415
See application file for complete search history.

(56) References Cited

U.S. PATENT DOCUMENTS

| | | | | |
|---|---|---|---|---|
| 5,003,576 | A | * | 3/1991 | Helferich ............ G08B 3/1016 379/67.1 |
| 2002/0126691 | A1 | * | 9/2002 | Strong .................. H04L 1/0002 370/447 |
| 2004/0064573 | A1 | * | 4/2004 | Leaning .................. H04L 29/06 709/231 |
| 2004/0179658 | A1 | * | 9/2004 | Lowmaster ........... H04M 3/487 379/88.17 |

* cited by examiner

*Primary Examiner* — Solomon Bezuayehu
(74) *Attorney, Agent, or Firm* — Stephen T. Straub; Ronald P. Straub; Michael P. Straub

(57) ABSTRACT

The invention features a computer-implemented method for playing back an announcement message to a user device. The method includes initiating, by a computing device, an announcement session in response to a user device establishing communication with the computing device and determining, by the computing device, the announcement message to be played back to the user device. The method includes loading, by the computing device, into a queue associated with the announcement session, a descriptor referencing a memory buffer on the computing device. The memory buffer includes a plurality of memory partitions, each memory partition storing at least one portion of the announcement message encoded at a different rate. The method includes the computing device scheduling play back of the announcement message, playing the announcement message to the user device at a first rate and receiving a request from the user device for playback at a second rate.

20 Claims, 7 Drawing Sheets

SYSTEMS AND METHODS FOR PLAYING RECORDED ANNOUNCEMENTS

RELATED APPLICATION

The present application is a continuation of U.S. patent application Ser. No. 13/030,064 filed Feb. 17, 2011 which is hereby expressly incorporated by reference in its entirety.

FIELD OF THE INVENTION

The invention relates generally to playback of recorded announcements in a network environment, and more particularly, to playback of adaptive multi-rate (AMR) and adaptive multi-rate wideband (AMR-WB) announcements.

BACKGROUND OF THE INVENTION

Numerous businesses provide recorded announcements to their customers via communication networks in support of services. For example, banking services use thousands of recorded announcements to inform customers of account status, lending opportunities, payment options, credit rates and other service options. At any point in time, a business may need to provide different permutations of announcement messages to thousands of callers and, depending on the reaction of each caller, execute real-time playback features such as aborting an announcement message if the caller disconnects the call or changing the message being played in response to a caller selecting an option from a user device.

In a Voice over Internet Protocol (VOIP) system, various codec can be used to encode pre-recorded announcement messages to facilitate their storage and transmission over an IP network. Known codec includes the adaptive multi-rate (AMR) format, uncompressed digital formats, such as the G.711 codec, compressed digital formats such as the G.72X codec which includes the adaptive multi-rate wideband (AMR-WB) format codified as G.722.2. In particular, the AMR codec enables mobile communication systems to use available bandwidth effectively. For example, in a Global System for Mobile (GSM) communications network, speech encoding rate can be dynamically adjusted using the AMR codec to adapt to varying transmission conditions. A sender typically encodes announcement messages at a specific AMR rate, such as at a negotiated rate established during call setup. To trigger mode adaptation, a receiver sends a code mode request (CMR) to the sender signaling the new mode it prefers to receive future message packets. The new mode can be selected by the receiver based on quality measurements of the channel between the receiver and the sender. More specifically, the requested AMR rate can represent the best codec mode in view of the channel conditions at the time. For example, when a channel is lightly loaded, the receiver can request that all voice traffic be given the highest AMR codec rate. When the loading increases due to increased call volume, to ensure new users do not get blocked, the receiver can request the sender to change the AMR rate to a lower rate, thus allowing a larger number of voice calls to be supported, albeit with lower voice quality. Hence, the AMR codec provides an optimized tradeoff between speech compression (i.e., the number bits used to convey speech) and the perceived quality of the speech delivered over a mobile network.

Upon receiving a CMR from a receiver, a sender typically uses a transcoder, such as in the form of a digital signal processor (DSP), to convert in real time an announcement message that is encoded in one rate to another rate requested by the receiver. However, real-time transcoding is expensive because, due to the high computational cost associated with performing transcoding, numerous transcoders are needed to support the number of receivers that typically exist in a service network.

SUMMARY OF THE INVENTION

The invention, in various embodiments, features systems and methods for playing recorded announcements in a network environment, and more particularly, playing AMR encoded announcements without using transcoders to convert the announcements from one coding rate to another.

In one aspect, the invention features a computer-implemented method for playing back an announcement message to a user device. The method includes initiating, by a computing device, an announcement session in response to a user device establishing communication with the computing device and determining, by the computing device, the announcement message to be played back to the user device. The method includes loading, by the computing device, into a queue associated with the announcement session, a descriptor referencing a memory buffer on the computing device. The memory buffer includes a plurality of memory partitions, each memory partition storing at least one portion of the announcement message encoded at a different rate. The method further includes the computing device scheduling play back of the announcement message, playing the announcement message to the user device at a first rate and receiving a request from the user device for playback at a second rate. In some embodiments, the descriptor includes at least one of a pointer referencing the memory buffer, a codec type of the announcement message, a characteristic of the memory buffer, or a flag indicating whether to send a notice to the computing device after the announcement message has been transmitted to the user device.

In another aspect, the invention features a computing device for playing back an announcement message to a user device. The computing device includes a central processing unit for initiating an announcement session in response to a user device establishing communication with the computing device. The central processing unit is adapted to determine the announcement message to be played back to the user device. The computing device includes at least one memory buffer comprising a plurality of memory partitions, each memory partition storing at least a portion of the announcement message at a different rate. The computing device also includes a queue associated with the announcement session for storing a descriptor referencing the memory buffer. The computing device further includes a scheduler for scheduling the play back of the announcement message, and an announcement player in communication with the scheduler and the queue for playing back the announcement message to the user device at a first rate. The computing device also includes a data processing unit for receiving a request from the user device to playback the announcement message at a second rate.

In yet another aspect, the invention features a computer program product, tangibly embodied in a computer readable medium, for playing back an announcement message to a user device. The computer program product includes instructions being operable to cause data processing apparatus to initiate an announcement session in response to a user device establishing communication with the computing device and determine the announcement message to be played back to the user device. The computer program product also includes instructions being operable to cause data processing apparatus to load into a queue associated with the announcement session a descriptor referencing a memory buffer on the computing device. The memory buffer includes a plurality of memory partitions, each memory partition storing at least one portion of the announcement message encoded at a different rate. The computer program product includes instructions being operable to cause data processing apparatus to schedule play back of the announcement message, play the announcement message to the user device at a first rate, and receive a request from the user device for playback at a second rate.

In other examples, any of the aspects above can include one or more of the following features. In various embodiments, the computing device can associate the request for rate change with the announcement session. In some embodiments, such association includes the computing device updating a playback pointer of the announcement session in response to the request. The computing device accomplishes this by determining a playback address in a memory buffer referenced by the playback pointer before the request. The playback address corresponds to the first rate. The computing device also determines a starting address of a memory partition in the memory buffer associated with the first rate. The computing device is adapted to compute an offset between the playback address and the starting address and determine a second starting address of a second memory partition in the memory buffer associated with the second rate. The computing device updates the playback address and the playback pointer by displacing the second starting address by the offset. In some embodiments, associating the request with the announcement session includes changing state information of the announcement session from the first rate to the second rate.

In some embodiments, the computing device updates a playback pointer of the announcement session in response to the request by changing a portion of the playback pointer to be the same as data included in the request that identifies a memory partition associated with the second rate.

In some embodiments, the computing device is further configured to encode the at least one portion of the announcement message at a plurality of different rates to produce at least one code word for each of the different rates. The computing device stores the at least one code word corresponding to the first rate at an offset from a starting address of the memory partition corresponding to the first rate. The computing device stores the at least one code word corresponding to the second rate at the same offset from a starting address of the memory partition corresponding to the second rate.

In some embodiments, each memory partition of the memory buffer comprises an identical partition size. In some embodiments, the memory buffer includes a descriptor referencing a next memory buffer in a linked list of memory buffers for storing consecutive portions of the announcement message.

In some embodiments, initiating the announcement session includes identifying an announcement ID that links the user device to the announcement session.

In some embodiments, the announcement player plays back the announcement message at the second rate from an address in memory referenced by a playback pointer of the announcement session.

In some embodiments, the scheduler schedules the play back by creating an announcement task that includes an announcement ID associated with the announcement session. The announcement task signals to the announcement player to play a packet of the announcement message. The announcement task can be stored in an announcement ID buffer for execution by the announcement player in a first-in-first-out manner. In some embodiments, the scheduler schedules announcement tasks for the announcement session on a periodic basis, such as every 10 ms, 20 ms, or at any interval specified by the announcement session.

In some embodiments, the computing device receives a signaling from the user device, identifies the announcement session associated with the user device, and flushes the queue of the announcement session in response to the signaling. The computing device can also load at least one descriptor into the queue, where the at least one descriptor references a different announcement message.

In some embodiments, the announcement message is encoded in one of G.711 format, G.72X format, or AMR format.

In some embodiments, the announcement message comprises a tone sample.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1:
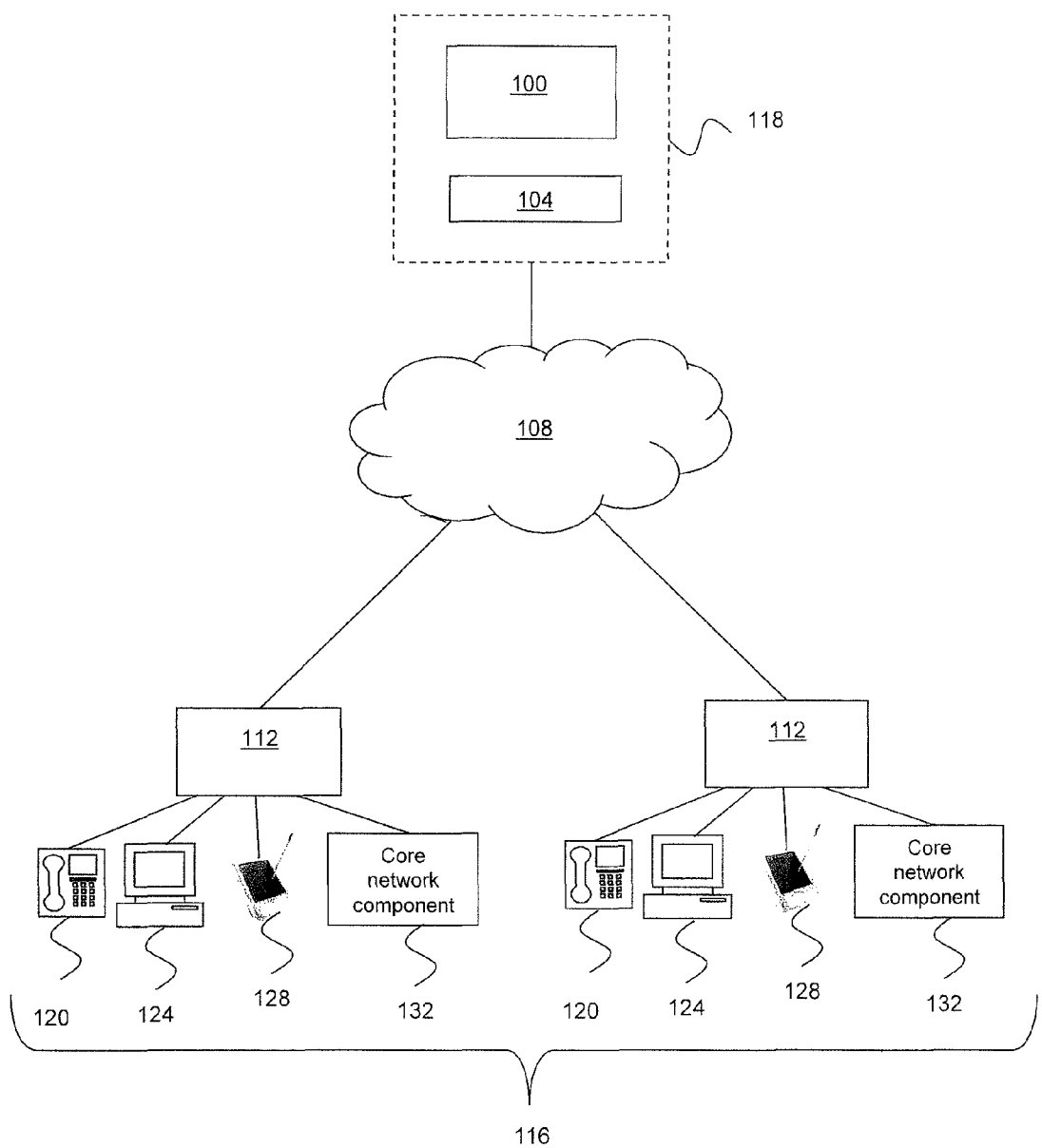
FIG. 1 shows a schematic diagram of an exemplary network environment for providing announcement messages.

FIG. 1 shows a schematic diagram of an exemplary network environment including a central announcement unit 100, a central edge device 104, an IP network 108, local edge devices 112, and user devices 116. At least one of the central announcement unit 100 and the central edge device 104 can be controlled and operated by a service provider 118, such as a provider of banking services.

A user device 116 can be, for example, a telephone 120, a computer 124, a personal digital assistant (PDA) 128, or other electronic devices capable of interfacing with an edge device. For example, a user device 116 can include a core network component 132, which can be telephone switches, soft switches, or session border controllers. A central edge device 104 and/or a local edge device 112 can be, for example, a router, a routing switch, an integrated access device (IAD), a multiplexer, a session border controller, or any device that can provide entry points or connections to network components and services. In certain embodiments, a central edge device 104 and/or a local edge device 112 is a Network Border Switch™ manufactured by Sonus Networks, Inc., such as an NBS 9000 or NBS5200.

The central announcement unit 100 is configured to manage signals received from user devices 116 and control playback of announcement messages to the user devices 116. Data received by the central announcement unit 100 can be in the form of one or more real-time transport protocol (RTP) packets or other types of IP packets. In operation, the central announcement unit 100 can deliver announcement packet(s) to a user device 116 via the IP network 108 in response to certain signaling data received from the user device 116. In some embodiments, the central edge device 104 includes a router for directing announcement packet(s) between the central announcement unit 100 and a local edge device 112. Similarly, a local edge device 112 can include a router for transmitting data between a user device 116 and the central edge device 104.

In some embodiments, a local edge device 112 includes one or more packet-to-circuit converters to convert between IP packets and time-division-multiplexing (TDM), circuit-switched data if, for example, the user device 112 associated with the local edge device 112 is a subscriber on the local end-office switch of the public switched telephone network. A local edge device 112 can also include one or more voice transcoders to convert between IP packets and data of compressed audio formats (e.g., mp3 files) when required by a user device 116. In some embodiments, one or more packet-to-circuit converters and/or voice transcoders reside on the central edge device 104.

Figure 2A:
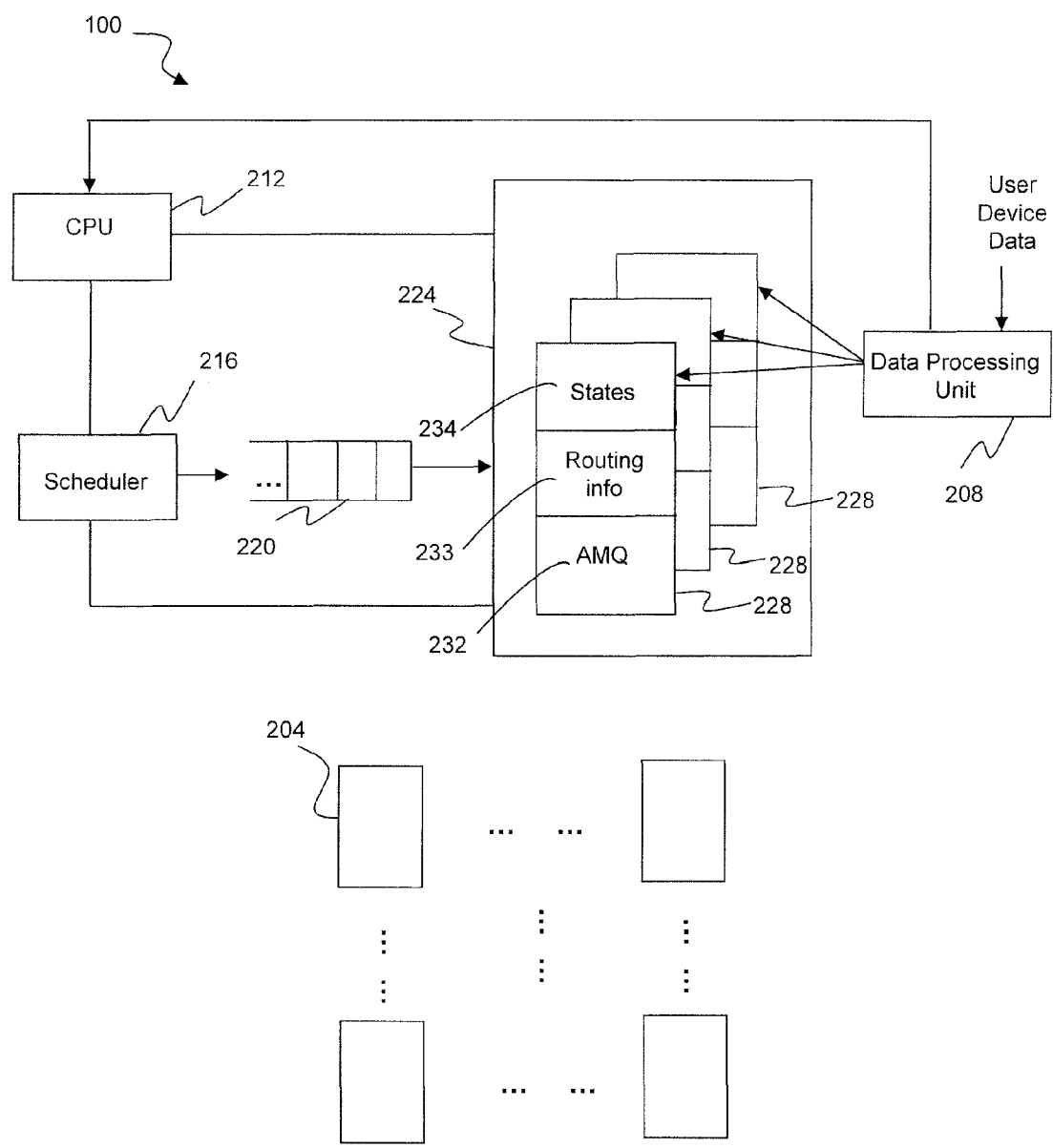
FIG. 2A shows a schematic diagram of an exemplary central announcement unit.

FIG. 2A shows an exemplary architecture of a central announcement unit 100 including one or more memory buffers 204, a data processing unit 208, a central processing unit (CPU) 212, an announcement scheduler 216, an announcement ID (AID) buffer 220, an announcement player 224, and one or more announcement sessions 228. The data processing unit 208 processes packets received from user devices 116 and transmits the processed data to various components in the central announcement unit 100 to trigger appropriate actions. In some embodiments, the CPU 212 provides an application program interface for managing and controlling playback of announcement messages to user devices 116.

Figure 2B:
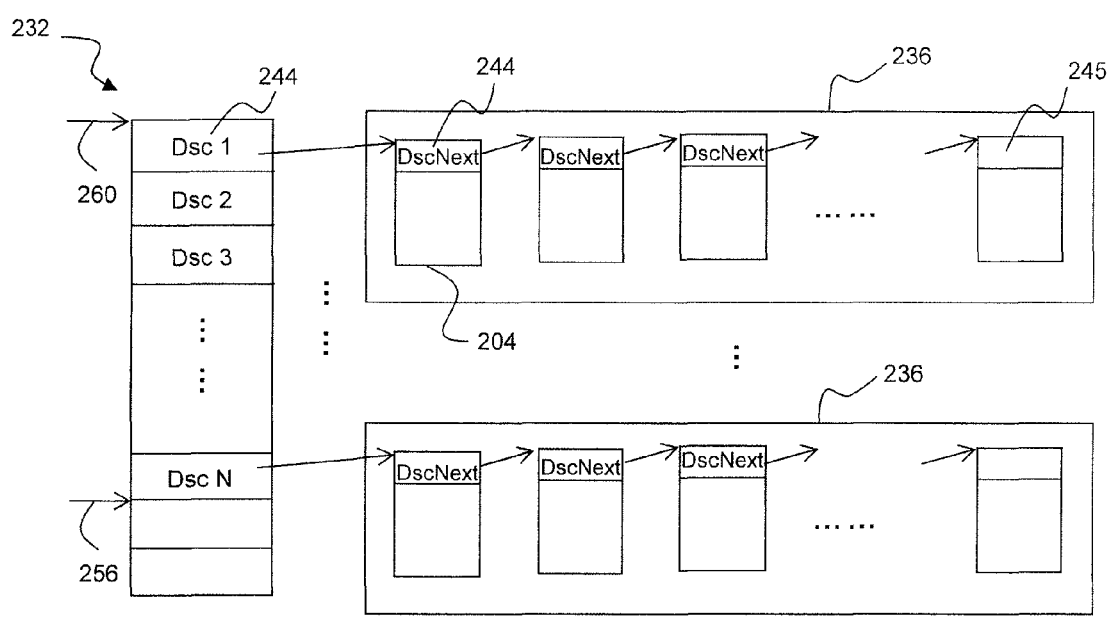
FIG. 2B shows a schematic diagram of an exemplary announcement message queue.

Each announcement session 228 stores information about a call from a user device 116 that is currently in session. Each announcement session 228 is associated with an announcement message queue (AMQ) 232, data structure(s) for storing routing information 233 and data structure(s) for storing state information (234). The AMQ 232 references address(es) of memory buffers 204 that store one or more announcement messages to provide to a user device 116. FIG. 2B shows an illustrative AMQ 232.

The announcement scheduler 216, in conjunction with the AID buffer 220, schedules tasks for execution by the announcement player 224, with each task signaling to the announcement player 224 the announcement session 228 that requires a packet to be transmitted to its user device 116. In response to the receipt of a task, the announcement player 224 assembles a packet by retrieving pertinent announcement data from the memory buffers 204 and transmits the packet to the user device 116 identified by the task.

The CPU 212 stores an announcement message in the memory buffer(s) 204 in various encoding formats including an uncompressed format, such as the G.711 codec, a compressed format, such as the G.72X codec, or the AMR codec. An announcement message can comprise a pre-recorded voice message that informs a user, for example, different service options available to the user. An announcement message can comprise idle and/or comfort noise that is played to a user when the user is being put on hold by an operator, for example. An announcement message can comprise a tone message such as a chime, beep, ring-back or line busy tone sample. For a tone message, the CPU 212 can compose the message based on a period (T) of a tone sample. Because messages of the central announcement unit 100 are transmitted to user devices 116 as discrete packets, if a tone sample period (T) does not fit into an integer number of announcement packets, the CPU 212 determines a least-common multiple (M) such that an integer number of packets can accommodate M*T periods of the tone sample.

As shown in FIG. 2B, the CPU 212 can use a linked list 236 of one or more memory buffers 204 to store an encoded announcement message, with each buffer 204 storing at least a portion of the message. Every buffer 204 can have a uniform size. Hence, the length of a linked list 236 can be proportional to the duration of the announcement message. In some embodiments, if the AMR codec is used to encode an announcement message, multiple versions of the message are stored in the memory buffers 204, with each version comprising the message encoded at a different AMR coding rate.

Figure 3A:
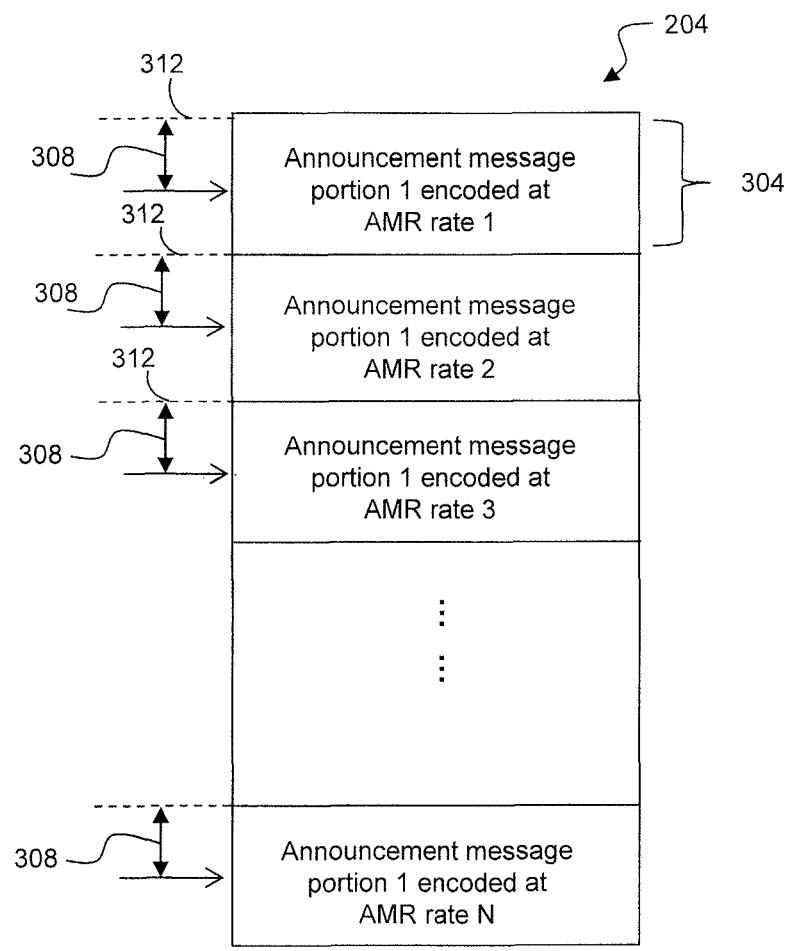
FIG. 3A shows a schematic diagram of a memory buffer for storing at least a portion of an AMR-encoded announcement message.

FIG. 3A shows an illustrative memory buffer 204 for storing at least a portion of an AMR-encoded announcement message. The buffer 204 is partitioned into multiple sub-buffers 304 of equal size with each sub-buffer 304 storing the message portion at a different AMR coding rate. Each sub-buffer 304 is sized to hold, for example, a fraction of a second worth of an announcement message. A message portion can be stored as one or more code words in each sub-buffer 304. A code word can include, for example, 10 ms or 20 ms worth of encoded speech sample. In some embodiments, each code word has the same length as an announcement packet.

Figure 3B:
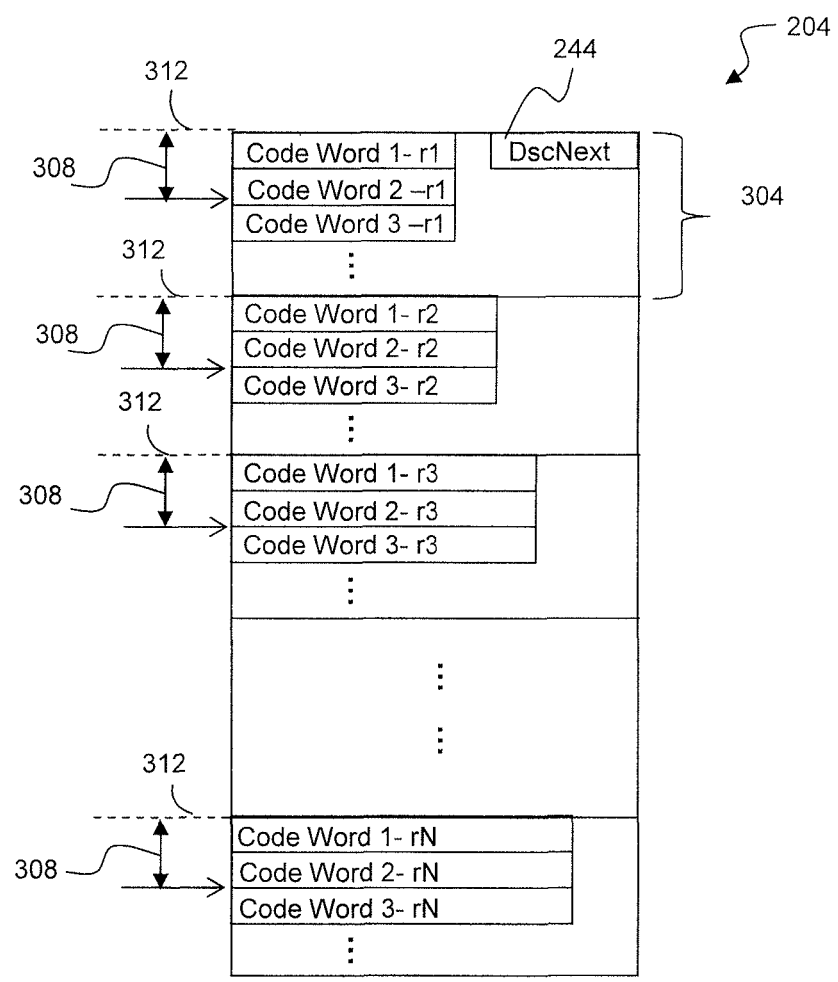
FIG. 3B shows another schematic diagram of a memory buffer for storing at least a portion of an AMR-encoded announcement message.

According to the storage scheme shown in FIG. 3B, each sub-buffer 304 can store the same number of code words. Each code word in a sub-buffer 304 has the same offset 308 from the starting address 312 of its sub-buffer 304 as the corresponding code word of a different sub-buffer 304. For example, Code Word 1 stored in Sub-buffer A is displaced by Offset 1 from the starting address of Sub-buffer A. Similarly, Code Word 1 in Sub-buffer B is displaced by the same offset (Offset 1) from the starting address of Sub-buffer B. As another example, Code Word 2 stored in Sub-buffer A is displaced by Offset 2 from the starting address of Sub-buffer A. Similarly, Code Word 2 in Sub-buffer B is also displaced by Offset 2 from the starting address of Sub-buffer B. As explained below in detail, this storage scheme enables efficient message playback when a user device makes a request to change the current coding rate for receiving announcement messages.

A portion of each memory buffer 204 includes a descriptor 244 of the next buffer 204. Both the current buffer 204 and the next buffer 204 are in a linked list of buffers 236 storing an announcement message. In some embodiments, a reserved portion of each memory buffer 204 is used to store a descriptor of the next buffer 204, as shown in FIG. 2B. In some embodiments, if AMR encoding is used, a descriptor is stored with the first code word in the first partition of a buffer 204, as shown in FIG. 3B.

A descriptor 244 generally provides a pointer to the starting address of the next buffer 204. A descriptor can also include other buffer-related information such as the how many code words are in the next buffer 204 or, if the message is encoded in the AMR format, how many code words are in each partition 304 of the next buffer 204. In some embodiments, the descriptor 244 for the first buffer 204 in a linked list of buffers 236 is loaded into an AMQ 232 by the CPU 212 if the CPU 212 decides that the announcement message referenced by the descriptor 244 needs to be transmitted to a user device 116 associated with the AMQ 232. The descriptor 244 for the first buffer 204 can include additional information describing the announcement message, such as a flag that can be set by the CPU 212 to indicate whether it would like to receive a notification from the announcement player 224 after the announcement player 224 has transmitted the message. The descriptor 244 for the first buffer 204 can also describe the codec used to encode the announcement message and/or the characteristics of the buffers used to store the message. Exemplary buffer characteristics include buffer type, buffer size, and/or the number of partitions in each buffer. In some embodiments, a portion 245 of the last buffer 204 in a linked list of buffers 236 includes one or more 0's or other indicators signaling the end of the list 236.

In some embodiments, if an announcement message involves a tone sample, the CPU 212 stores the tone message in a circular linked list of buffers (not shown) such that the descriptor 244 of the last buffer 204 of the linked list references the first buffer 204 of the list. This data structure ensures that a tone sample of any duration can be played seamlessly.

The data processing unit 208 is configured to process data, in the form of IP packets, received from a user device 116. In particular, the data processing unit 208 processes the received data by first coordinating the data with an AID that links the user device 116 to an active announcement session 228 maintained by the central announcement unit 100. Details regarding AID assignment will be described below.

In some embodiments, the data transmitted by a user device 116 to the data processing unit 208 includes a CMR automatically generated by the user device 116 based on, for example, signal strength or channel condition. Upon receiving the CMR, the data processing unit 208 determines the AID of the announcement session 228 affected by the CMR and changes certain information of the announcement session 228 accordingly to implement the requested rate change. This update effectively alters the rate at which subsequent announcement packets are transmitted to the user device 116 of the announcement session 228. In some embodiments, the data received by the data processing unit 208 includes signaling information sent by a user device 116 as a result of the user entering one or more digits via the user device 116, for example. Upon receiving signaling-related packet(s), the data processing unit 208 forwards the information to the CPU 212 to initiate appropriate actions in response to the signaling.

The CPU 212 is configured to manage signaling data received from a user device. For example, if the signaling data comprises the user device 116 initiating a call to the service provider 118, the CPU 212 can activate a new announcement session 228. In this case, the CPU 212 assigns an AID to the new session 228 which can include routing information for directing communication between the central announcement unit 100 and the user device 116 from which the call originated.

If the user device 116 is already associated with an existing announcement session 228 linked by an AID, the CPU 212 can assign one or more announcement messages to the announcement session 228 if the signaling data received from the user device 116 necessitates such action. For example, the CPU 212 can assign appropriate announcement message(s) to an announcement session 228 if the user device 116 selects an option in response to a menu of options played to the user device 116. To assign an announcement message to an announcement session 228, the CPU 212 loads into the AMQ 232 associated with the announcement session 228 a descriptor 244 of the announcement message. In some embodiments, the AMQ descriptor 244 is the same as the descriptor of the first buffer 204 in a linked list of buffers 236 that stores the announcement message.

In some embodiments, the CPU 212 can abort one or more announcement messages yet to be played to a user device 116 of an announcement session 228 by flushing their descriptors from the AMQ 232 of the announcement session 228 and/or disable the AID of the announcement session 228. The CPU 212 deactivates an AID if, for example, the user disconnects the call. In such a situation, the CPU 212 can reassign data structure(s) associated with the deactivated session 228 to a new session 228. In some embodiments, after flushing an AMQ 232, the CPU 212 can load another set of descriptors 244 into the AMQ 232 in response to, for example, the user making another selection via the user device 116. The new descriptors 244 can reference a different set of announcement messages.

The AMQ 232 maintains a list of descriptors 244 each referencing an announcement message for playback to the user device of the announcement session 228. The routing information 233 can include an address or any other identifier of the user device 116, the local edge device 112 and/or the channel to which the announcement messages are sent.

The state information 234 generally sets one or more playback conditions for the announcement player 224. In some embodiments, the state information 234 specifies an interval at which the announcement player 224 can send an announcement packet to the user device 116 associated with the announcement session 228. The interval can be 5 ms, 10 ms, 20 ms or any periodic duration chosen by the announcement session 228. In some embodiments, the state information 234 reflects when idle and/or comfort noise is being played to the user device 116 by the announcement player 224.

In some embodiments, the state information 234 describes the codec used to encode the announcement messages. If the AMR codec is used, the state information 234 can additionally indicate the current AMR coding rate at which the announcement player 224 transmits a packet to the user device 116. In some embodiments, the current AMR coding rate can be a default rate selected by the central announcement unit 100 if, for example, the user device 116 has not specified a coding rate it prefers to receive announcement packets. In some embodiments, a user device 116 can change the current coding rate by sending a CMR to the central announcement unit 100. In response, the data processing unit 208 interacts with the corresponding announcement session 228 to update the current coding rate which is stored as a part of the state information 234.

The state information 234 can include a playback pointer to an address in a memory buffer 204 used by the announcement player 224 to determine the location at which the next announcement packet is segmented for delivery to the user device 116. In some embodiments, if an announcement session 228 detects that the current coding rate of the state information 234 has been changed, the announcement session 228 updates its playback pointer accordingly by positioning the pointer to a new location in memory. The new location enables the announcement player 224 to retrieve the subsequent packet data at the requested rate. To accomplish this, the announcement session 228 first determines the amount of offset between the current address referenced by the playback pointer before the rate change request and the starting address 312 of the sub-buffer 304 containing the current address. The announcement session 228 then determines the starting address 312 of the sub-buffer 304 corresponding to the requested coding rate. The announcement session proceeds to displace the second starting address 312 by the offset to determine the new address for positioning the playback pointer.

In some embodiments, a playback pointer can comprise a data structure including data bits storing the offset value, data bits referencing the target sub-buffer and data bits storing the address of the target memory buffer. As an illustrative example, given an AMR codec having 8 different coding rates, each memory buffer is adapted to include 8 equal-sized sub-buffers. This means that the playback pointer can use 3 bits of its data structure to reference a target sub-buffer among the 8 sub-buffers. In the event that a user device 116 requests a coding rate change, the user device 116 can also express the new rate, selected from coding rates 1 to 8, using 3 data bits. Accordingly, the announcement session 228 can update its playback pointer in response to the request by simply setting its sub-buffer data bits to be the same as the 3 bits used to convey the new rate. The data bits corresponding to the offset value and the address of the target memory buffer in the updated playback pointer remain the same.

Storing multiple encodings of an announcement message in parallel sub-buffers 304 is advantageous because it allows the playback pointer to be portable across the sub-buffers 304. This scheme thus obviates the need to re-seek to a desired playback point in a message each time a change in coding rate is requested.

In some embodiments, the state information 234 includes a put pointer 256 to indicate to the CPU 212 the next available node in the AMQ 232 for storing a descriptor 244 of a new announcement message. After the CPU 212 loads a descriptor 244 into a current node referenced by the put pointer 256, the announcement session 228 automatically advances the put pointer 256 to the next available node. If the AMQ 232 is full, the announcement session 228 sets the put pointer 256 to an appropriate value to indicate the full status. In such a situation, the CPU 212 can cease to load more descriptors 244 into the AMQ 232 until additional nodes in the AMQ 232 become available.

In some embodiments, the state information 234 includes a get pointer 260 to indicate to the announcement player 224 the next announcement message in the AMQ 232 to be played back to the user device 116. The get pointer 260 can select messages in the AMQ 232 for playback in a first-in-first-out manner or any other order conditioned by the announcement session 228.

In some embodiments, the state information 234 includes a play status to indicate to the scheduler 216 whether the scheduler 216 should schedule the next packet transmission to the user device 116. The play status can comprise a play state which indicates to the scheduler 216 to continue scheduling packet transmissions for the announcement session 228. Alternatively, the play status can comprise a stop-scheduling state to signal to the scheduler 216 to cease any scheduling activity for the session 228.

The announcement scheduler 216 is configured to periodically schedule the next announcement packet to be transmitted by the announcement player 224 for one or more active announcement sessions 228. To accomplish this, the announcement scheduler 216 generates an announcement task that includes an AID identifying the appropriate announcement session 228 and, in turn, the corresponding AMQ 232 as well as the associated announcement message from which the announcement player segments the next packet. In some embodiments, if the play status of the announcement session 228 is set to the play state, the announcement scheduler 216 generates announcement tasks for the session 228 at a regular interval specified by the announcement session 228. In some embodiments, if the play status of the announcement session 228 is set to the stop-scheduling state, the announcement scheduler 216 ceases to generate additional tasks for the announcement session 228. As explained above, both the interval information and the play status can be stored as a part of the state information 234 of the announcement session 228. In general, the announcement scheduler 216 can schedule packet transmission for one or more active announcement sessions 228 using any known scheduling algorithm. After the announcement scheduler 216 generates a task, the scheduler 216 stores the task in the AID buffer 220 that is configured to provide tasks to the announcement player 224 on a first-in-first-out basis or any other order of service.

The announcement player 224 services a task received from the AID buffer 220 by retrieving the announcement session 228 indexed by the AID of the task. The announcement player 224 then composes a packet of announcement message using the state information 234 provided by the announcement session 228. The announcement player proceeds to transmit the announcement packet to the user device 116 associated with the announcement session 228 using the routing information 233 provided by the session 228.

The announcement player 224 segments a packet of announcement message from a memory location referenced by the playback pointer of the announcement session 228. As explained above, the playback pointer can be stored as a part of the state information 234. As an example of packet segmentation, the announcement player 224 is adapted to retrieve one or more code words starting from the address referenced by the playback pointer. The announcement player 224 then advances the playback pointer accordingly to prepare for next packet segmentation and transmission. The announcement player 224 also assembles the retrieved data into a packet, along with affixing a header to the packet using the routing information 233 provided by the announcement session 228.

In some embodiments, a packet includes data retrieved from a buffer 204 or sub-buffer 304 that stores a portion of an announcement message. In some embodiments, a packet includes data retrieved from multiple buffers 204 or sub-buffers 304 storing multiple portions of an announcement message. In some embodiments, a packet includes data retrieved from multiple buffers 204 or sub-buffers 304, with at least one buffer 204 or sub-buffer 304 storing a portion of one announcement message and at least another buffer 204 or sub-buffer 304 storing a portion of another announcement message.

After the announcement player 224 retrieves a packet worth of data, the announcement player 224 advances the data pointer to the next location in memory from which a subsequent packet can be segmented. The distance the announcement player 224 advances the data pointer is proportional to the length of the announcement packet. In some embodiments, the next location is in the same buffer 204 as the current location referenced by the playback pointer, in which case both locations are associated with same announcement portion. If the AMR encoding is used, the next location is in the same sub-buffer 304 as the current location. In some embodiments, the next location is in a different buffer 204 but in the same linked list 236 as the current buffer 204, in which case each of the current and next locations is associated with a different portion of the same announcement message. If the AMR encoding is used, the next location is in a parallel partition 304 of the next buffer 204 relative to the partition 304 of the current buffer 204. In some embodiments, the next location is in a different buffer 204 and in a different linked list 236 in comparison to the current buffer 204, in which case each of the current and next locations is associated with a different announcement message. If the AMR encoding is used, the next location is in a parallel partition 304 of the next buffer 204 relative to the partition 304 of the current buffer 204. The announcement player 224 can select the next announcement message to advance the playback pointer based on the get pointer 260 maintained by the announcement session 228. As described above, the get pointer 260 indicates to the announcement player 224 the next announcement message in the AMQ 232 not yet played.

After the announcement player 224 transmits an announcement packet for an announcement session 228 and updates the playback pointer of the session 228 accordingly, the announcement player 224 can also update the play status of the state information 234 associated with the session 228. As described above, the announcement scheduler 216 determines whether to schedule a subsequent packet for transmission based on the play status. In some embodiments, after transmission of a packet from a buffer location 204, if the announcement player 224 detects that more data remains to be played from the same buffer 204 or if there are more buffers 204 remaining in the same linked list 236, the announcement player 224 sets the play status to the play state, thereby signaling to the scheduler 216 to schedule another packet transmission. In some embodiments, if at least one announcement message remains in the AMQ 232 yet to be played by the announcement player 224, the announcement player 224 sets the play status to the play state. In some embodiments, if the AMQ 232 is empty and the AID of the announcement session 228 is inactive, the announcement player 224 sets the play status to the stop-scheduling state, thereby signaling to the scheduler 216 to cease all scheduling activity for the announcement session 228. In some embodiments, if the AMQ 232 is empty and the AID of the announcement session 228 remains active, the announcement player 224 sets the state information appropriately to indicate to the scheduler 216 that idle and/or comfort noise should be scheduled for playback to the user device 116 on a per-packet basis until the CPU 212 loads additional descriptor(s) 244 of announcement message(s) into the AMQ 232 of the announcement session 228.

The announcement player 224 can optionally transmit a sent indication to the CPU 212 after transmitting an announcement message to the user device 116. In response, the CPU 212 can decide to queue one or more additional messages into the AMQ 232 if needed. The announcement player 224 provides the sent indication to the CPU 212 if, for example, a descriptor 244 in the AMQ 232 associated with the announcement message includes a sent flag that is set by the CPU 212 during loading to indicate that it would like to receive the sent indication.

Figure 4:
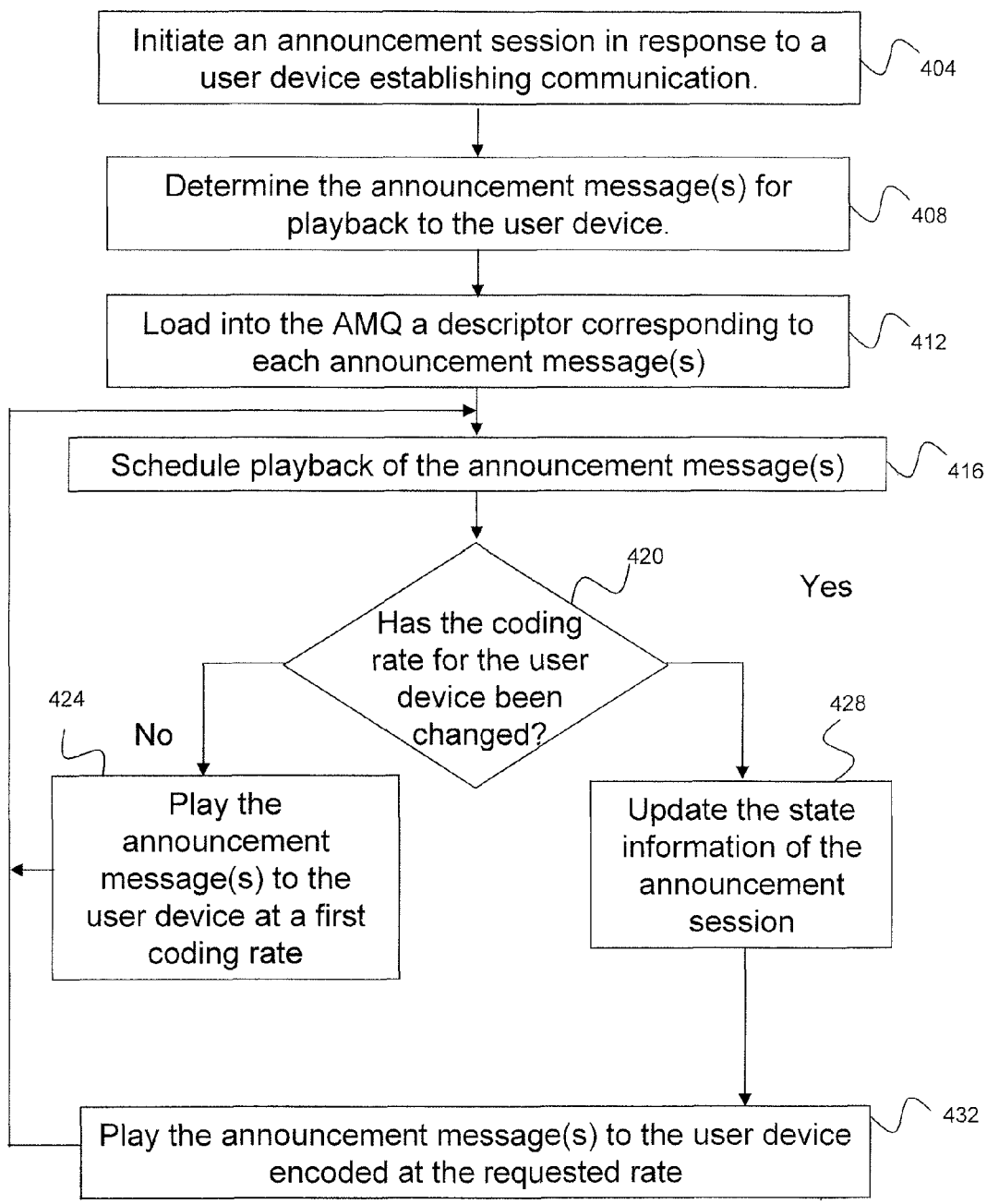
FIG. 4 shows a flow diagram illustrating an exemplary process for playing announcement messages.

FIG. 4 shows an exemplary announcement distribution process. Upon a user establishing communication with a service provider 118 from a user device 116, the service provider 118 initiates an announcement session 228 in the central announcement unit 100 (step 404). This can involve the central announcement unit 100 assigning an AID to the announcement session 228 and initializing an AMQ 232 as well as data structure(s) for maintain routing information 233, state information 234 or other announcement-related information required by the announcement session 228.

The CPU 212 then determines whether one or more announcement messages need to be played to the user device 116 (step 408). The CPU 212 also determines the codec type used to encode the announcement messages. Exemplary announcement messages for playback to a user include a greeting message and/or a menu of service options.

To prepare for playback, the CPU 212 loads descriptor(s) 244 of the identified message(s) into the AMQ 232 of the announcement session 228 (step 412). Each descriptor 244 references the starting address of a linked list 236 of memory buffers 204 storing the corresponding announcement message. If each announcement message is encoded in the AMR format, the CPU 212 can store multiple versions of the message in a linked list 236 of buffers 204 according to the format shown in FIG. 3A. As illustrated, each buffer 204 is partitioned into sub-buffers 304 of equal size, and each sub-buffer 304 stores a portion of the announcement message encoded at a different coding rate. In particular, a code word of an announcement portion encoded at one rate can have the same offset 308 from the starting address 312 of its sub-buffer 304 as the corresponding code word of the portion encoded a different rate.

Based on the play status of the announcement session 228, the announcement scheduler 216 schedules playback of the announcement message(s) from the AMQ 232 on a periodic basis (step 416). The play status and/or the periodic interval can be a part of the state information 234 of the announcement session 228. The scheduler 216 is adapted to generate an announcement task for each scheduling instruction, with each task identifying the AID of an announcement session 228 that requires a packet to be serviced.

During an active announcement session 228, the data processing unit 208 is configured to receive one or more CMRs from the user device 116. For each CMR received, the data processing unit 208 determines whether the coding rate for the user device has changed (step 420). A user device 116 can communicate the CMR as a part of an RTP packet, for example.

If a CMR has not been received by the data processing unit 208 or if a CMR does not communicate a rate change for the user device 116, the announcement player 224 continues to play an announcement packet at the default or most recent coding rate (step 424) upon receiving a task from the AID buffer 220.

To accomplish transmission of an announcement packet, the announcement player 224 retrieves one or more code words from the memory buffer(s) 204 storing the announcement message(s) of the announcement session 228 and packages the codes words into a packet. In some embodiments, the announcement player 224 obtains the code words starting from an address in memory referenced by the playback pointer of the announcement session 228. After assembling the current packet, the announcement player 224 can update the playback pointer accordingly to reference the starting address of the next packet to be segmented. The next location can be in the same buffer 204 as the previous location or in the same sub-buffer 304 if AMR encoding is used. The next location can be in a different buffer 204 but in the same linked list 236 as the previous location or in parallel sub-buffers 304 of the same linked list 236 if AMR encoding is used. The next location can be in a different buffer 204 and in a different linked list 236 as the previous location, or in parallel sub-buffers 304 of different linked lists 236 if AMR encoding is used. The announcement player 224 determines the next announcement message to advance the playback pointer based on the get pointer 260 of the announcement session 228.

After segmentation, the announcement player 224 transmits the segmented packet to the user device 116 via the central edge device 104, the IP network 108 and the appropriate local edge device 112. In some embodiments, the service provider 118 converts the packets to a format suitable for output to the user device 116 before transmission. In some embodiments, the local edge device 112 converts the IP packets to the appropriate format before forwarding the announcement data to the user device 116.

If the data processing unit 208 receives a request to change the coding rate, the data processing unit 208 associates the request with the announcement session 228 based on the AID of the session 228. In response, the announcement session 228 updates its state information 234 to execute the rate change (step 428). An exemplary procedure implemented by the announcement session 228 to update its state information 234 is described below with reference to FIG. 5. Based on the updated state information 234, the announcement player 224 delivers subsequent packets to the user device 116 encoded at the requested rate (step 432).

Figure 5:
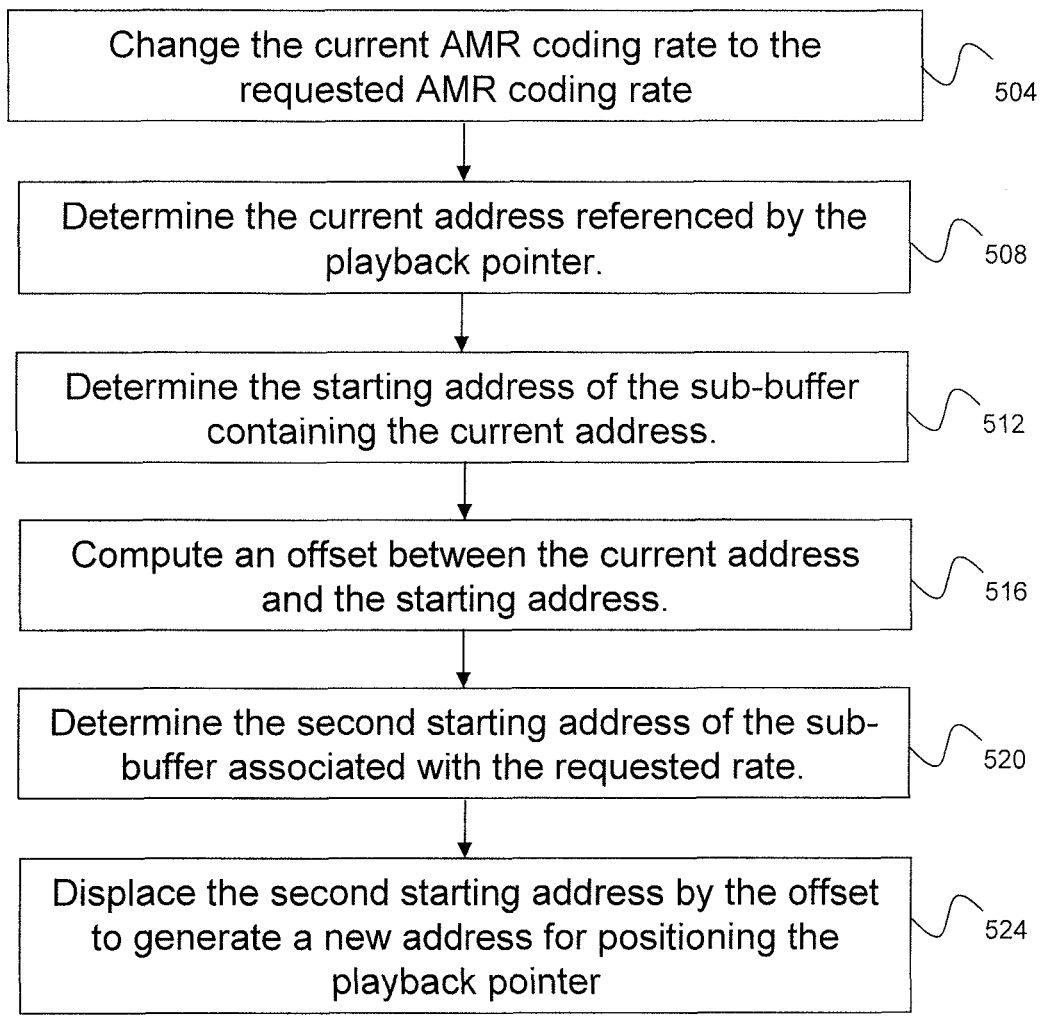
FIG. 5 shows a flow diagram illustrating an exemplary process for updating pertinent information of an announcement session in response to a request from a user device to change the current AMR coding rate.

FIG. 5 shows a flow diagram illustrating an exemplary process implemented by an announcement session 228 to update its state information 234 in response to a request from a user device 116 to change the current AMR coding rate. The process begins with the announcement session 228 adjusting its current coding rate, maintained as a part of the state information 234, to the requested coding rate (step 504).

The announcement session 228 also adjusts the playback pointer by positioning the pointer to the next location in memory from which the announcement player 224 can retrieve subsequent data at the request rate. To accomplish this, the announcement session 228 first determines the current address in a memory buffer 204 referenced by the playback pointer (step 508). The current address corresponds to the previous coding rate. The announcement session then determines the starting address 312 of the sub-buffer 304 in the memory buffer 204 containing the current address (step 512). The announcement session 228 is adapted to compute an offset between the current address and the starting address 312 (step 516). The announcement session 228 proceeds to determine the starting address of the sub-buffer 304 in the same memory buffer 204 that corresponds to the requested coding rate (step 520). The announcement session 228 then displaces the second starting address by the offset to determine the new address for positioning the playback pointer (step 524).

In some embodiments, a playback pointer comprises a data structure including data bits storing the offset value, data bits referencing the target sub-buffer and data bits storing the address of the target memory buffer. In the event of a CMR, a user device 116 can request a coding rate change by sending one or more bits of data conveying the requested rate. In response to the request, the announcement session 228 updates the playback pointer by setting the sub-buffer bits of the playback pointer to be the same as the new rate conveyed by the CMR.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). Mobile computing device include, for example, a Blackberry®. IP phones include, for example, a Cisco® Unified IP Phone 7985G available from Cisco Systems, Inc, and/or a Cisco® Unified Wireless Phone 7920 available from Cisco Systems, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computer-implemented method for playing back an announcement message to a user device, comprising:
    initiating, by a computing device, an announcement session in response to a user device establishing communication with the computing device;
    determining, by the computing device, the announcement message to be played back to the user device;
    loading, by the computing device, into a queue associated with the announcement session, a descriptor referencing a memory buffer on the computing device, the memory buffer comprising a plurality of memory partitions, each memory partition storing at least one portion of the announcement message encoded at a different rate;
    scheduling, by the computing device, play back of the announcement message;
    playing, by the computing device, the announcement message to the user device at a first rate; and
    receiving, by the computing device, a request from the user device for playback of the announcement message at a second rate.

2. The computer-implemented method of claim 1 wherein said memory buffer includes a first portion of said announcement encoded for playback at different rates, a first one of said plurality of memory partitions including a first encoded version of said first portion of said announcement, encoded for playback at said first rate, a second one of said plurality of memory partitions including a second encoded version of said first portion of said announcement, encoded for playback at said second rate.

3. The computer-implemented method of claim 2 further comprising associating, by the computing device, the request with the announcement session, said associating including updating a playback pointer of the announcement session in response to the request by:
    determining a playback address in a memory buffer referenced by the playback pointer before the request, the playback address corresponding to the first rate;
    determining a starting address of a memory partition in the memory buffer associated with the first rate;
    computing an offset between the playback address and the starting address;
    determining a second starting address of a second memory partition in the memory buffer associated with the second rate; and
    displacing the second starting address by the offset to update the playback address and the playback pointer.

4. The computer-implemented method of claim 2 further comprising associating, by the computing device, the request with the announcement session, said associating including updating a playback pointer of the announcement session in response to the request by changing a portion of the playback pointer to be the same as data included in the request that identifies a memory partition associated with the second rate.

5. The computer-implemented method of claim 2 further comprising associating, by the computing device, the request with the announcement session, said associating including changing state information of the announcement session from the first rate to the second rate in response to the request.

6. The computer-implemented method of claim 1 wherein the memory buffer includes a descriptor referencing a next memory buffer in a linked list of memory buffers for storing consecutive portions of the announcement message.

7. The computer-implemented method of claim 1 wherein initiating the announcement session comprises identifying an announcement ID that links the user device to the announcement session.

8. The computer-implemented method of claim 1 further comprising playing back, by an announcement player, the announcement message at the second rate from an address in memory referenced by a playback pointer of the announcement session.

9. The computer-implemented method of claim 8 wherein scheduling the play back further comprises:

creating an announcement task including an announcement ID associated with the announcement session; and storing the announcement task in an announcement ID buffer for execution by the announcement player in a first-in-first-out manner.

10. The computer-implemented method of claim 1 further comprising:

receiving, by the computing device, a signaling from the user device;

identifying, by the computing device, the announcement session associated with the user device;

flushing, by the computing device, the queue of the announcement session in response to the signaling; and loading, by the computing device, a descriptor into the queue, the descriptor referencing at least one different announcement message.

11. The computer-implemented method of claim 1 wherein the announcement message is encoded in one of G.711 format, G.72X format, or AMR format.

12. The computer-implemented method of claim 1 wherein the descriptor includes at least one of a pointer referencing the memory buffer, a codec type of the announcement message, a characteristic of the memory buffer, or a flag indicating whether to send a notice to the computing device after the announcement message has been sent to the user device.

13. The computer-implemented method of claim 1 wherein scheduling play back of the announcement message further comprises scheduling the play back at a periodic interval specified by the announcement session.

14. A computing device for playing back an announcement message to a user device, comprising:

a central processing unit for initiating an announcement session in response to a user device establishing communication with the computing device, the central processing unit is adapted to determine the announcement message to be played back to the user device;

a memory buffer comprising a plurality of memory partitions, each memory partition storing at least a portion of the announcement message at a different rate;

a queue associated with the announcement session for storing a descriptor referencing the memory buffer;

a scheduler for scheduling the play back of the announcement message;

an announcement player in communication with the scheduler and the queue for playing back the announcement message to the user device at a first rate; and a processing unit for receiving a request from the user device to playback the announcement message at a second rate.

15. The computing device of claim 14 wherein the announcement session, in response to the request, updates state information of the announcement session from the first rate to the second rate.

16. The computing device of claim 14 wherein the announcement session, in response to the request, updates a playback pointer of the announcement session to reference an address associated with the announcement message encoded at the second rate.

17. The computing device of claim 14 wherein the scheduler further comprises circuitry for creating an announcement task that includes an announcement ID referencing the announcement session, the announcement task signals to the announcement player to play a packet of the announcement message.

18. The computing device of claim 14 further comprising a linked list of memory buffers for storing consecutive portions of the announcement message encoded at a plurality of different rates.

19. The computing device of claim 14 wherein each memory partition comprises an identical partition size.

20. A computer program product, tangibly embodied in a non-transitory computer readable medium, for playing back an announcement message to a user device, the computer program product including instructions being operable to cause data processing apparatus to:

initiate, by a computing device, an announcement session in response to a user device establishing communication with the computing device;

determine, by the computing device, the announcement message to be played back to the user device;

load, by the computing device, into a queue associated with the announcement session, a descriptor referencing a memory buffer on the computing device, the memory buffer comprising a plurality of memory partitions, each memory partition storing at least one portion of the announcement message encoded at a different rate;

schedule, by the computing device, play back of the announcement message;

play, by the computing device, the announcement message to the use device at a first rate; and receive, by the computing device, a request from the user device for playback of the announcement message at a second rate.

* * * * *